(12) United States Patent
Dixon

(10) Patent No.: US 9,026,932 B1
(45) Date of Patent: May 5, 2015

(54) EDGE NAVIGATION USER INTERFACE

(75) Inventor: Scott Dixon, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 507 days.

(21) Appl. No.: 12/761,747

(22) Filed: Apr. 16, 2010

(51) Int. Cl.
*G06F 3/0483* (2013.01)

(52) U.S. Cl.
CPC ................... *G06F 3/0483* (2013.01)

(58) Field of Classification Search
CPC ........ G06F 3/048; G06F 17/21; G06F 3/0483
USPC ........... 715/776, 702, 712, 863; 345/473, 901
See application file for complete search history.

(56) References Cited

U.S. PATENT DOCUMENTS

| | | | |
|---|---|---|---|
| 5,444,836 A * | 8/1995 | Hollingsworth et al. ..... | 345/634 |
| 6,243,071 B1 * | 6/2001 | Shwarts et al. ............... | 715/823 |
| 6,874,128 B1 * | 3/2005 | Moore et al. .................. | 715/792 |
| 8,185,842 B2 * | 5/2012 | Chang et al. .................. | 715/776 |
| 2002/0015064 A1 * | 2/2002 | Robotham et al. ............ | 345/863 |
| 2004/0183776 A1 * | 9/2004 | Ho ................................ | 345/156 |
| 2005/0005246 A1 * | 1/2005 | Card et al. .................... | 715/776 |
| 2007/0266304 A1 * | 11/2007 | Fletcher et al. ............ | 715/500.1 |
| 2008/0163053 A1 * | 7/2008 | Hwang et al. ................ | 715/702 |
| 2008/0211785 A1 * | 9/2008 | Hotelling et al. ............ | 345/173 |
| 2009/0300539 A1 * | 12/2009 | Hendricks ..................... | 715/779 |

* cited by examiner

*Primary Examiner* — Amy Ng
*Assistant Examiner* — Claudia Dragoescu
(74) *Attorney, Agent, or Firm* — Lee & Hayes, PLLC

(57) ABSTRACT

A user interface for a touch-screen display of a computing device is described. The user interface has an edge navigation feature designed to facilitate navigation through digital content items, such as electronic books, in response to user input received via the touch-screen display. This navigation may be to an arbitrary point within the content, or to previously defined bookmarks. The user interface provides a representation of a virtual edge of the content object, such as a book or album. Presentation of this virtual edge, overlaid with bookmark indicators, allows the user to spatially visualize the position of content within the book, and select a desired location or bookmark.

28 Claims, 15 Drawing Sheets

EDGE NAVIGATION USER INTERFACE

BACKGROUND

A large and growing population of users enjoy entertainment through the consumption of digital media items, such as music, movies, images, electronic books, and so on. These users employ various electronic devices to consume such media items. Among these electronic devices are electronic book readers, cellular telephones, personal digital assistant (PDA), portable media players, tablet computers, netbooks, and the like. Two devices that are gaining in popularity are tablet devices and electronic book readers, each of which attempts to mimic the experience of reading a conventional book through display of electronic information on one or more electronic displays. As the quantity of available media content continues to grow, along with increasing proliferation of such dedicated devices to consume that media content, finding ways to enhance user experience continues to be a priority. As electronic devices continue to evolve, there remains a need for improving a reader's ability to interact with these devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
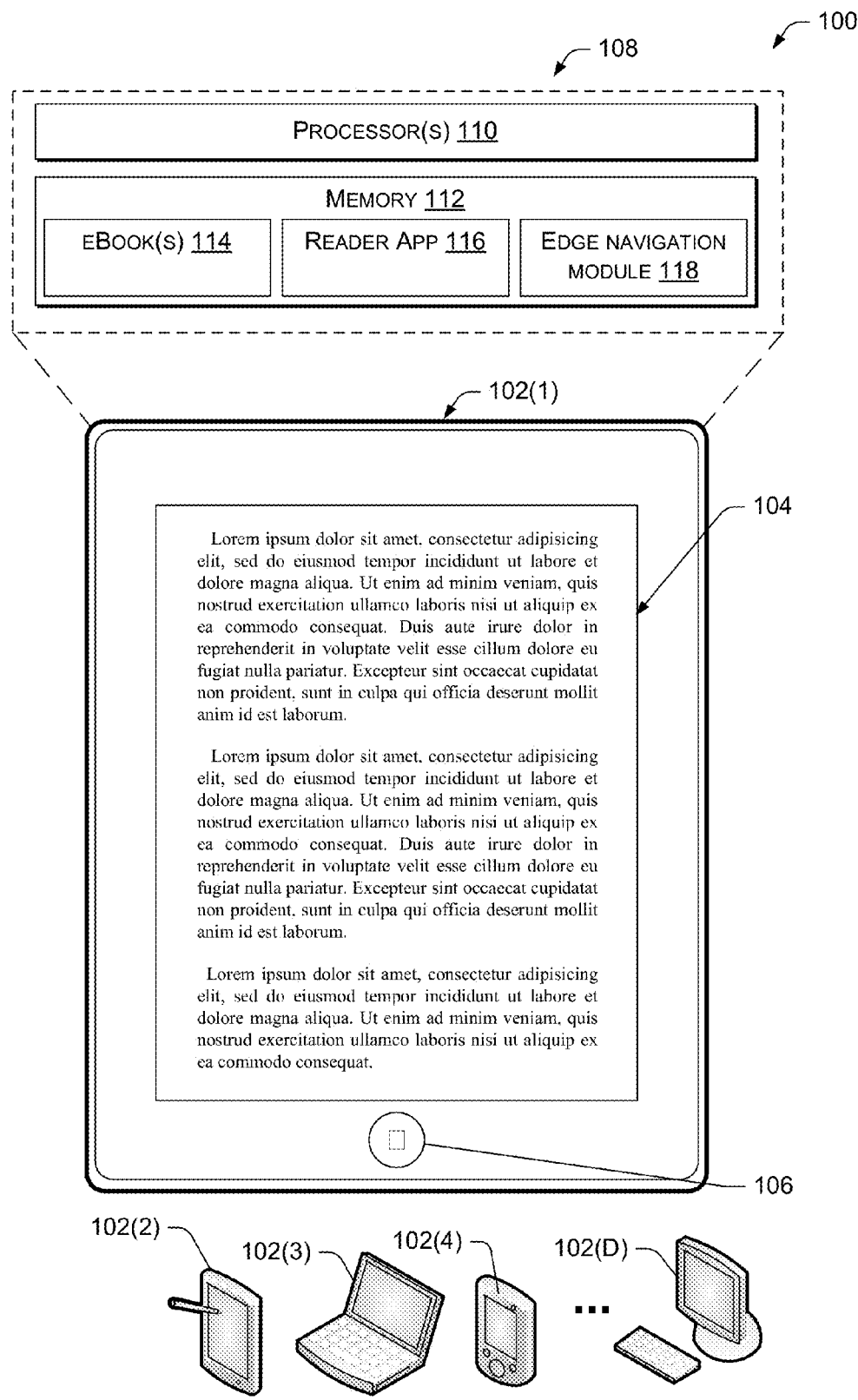
FIG. 1 illustrates one example implementation of an example electronic device (here, a tablet device) and a block diagram showing example components that may be implemented in the tablet device.

This disclosure is directed to user interface techniques for an electronic device that are designed to facilitate navigation through locations in digital content items. In some instances described below, the techniques facilitate navigation through locations that have been previously bookmarked within the digital content items. To improve user interaction, the devices described herein may incorporate a touch sensor capable of discerning multiple touches, or "multi-touch." In one implementation, the display mounted in the electronic device is a touch-screen display capable of functioning as both an input and an output component.

While the following description describes example gestures for navigating digital content items, these gestures may vary based on a variety of factors. For instance, the association of a particular gesture with a command may be modified to provide for localization factors stemming from presentation differences between languages, cultures, and so forth. For example, a user reading an electronic book in English may use a left swipe gesture to command a change to the next page. In contrast, a user reading an electronic book in Japanese may use a right swipe gesture to command the change to the next page.

For discussion purposes, the edge navigation techniques are described within the context of electronic books being rendered on tablet devices. However, these techniques apply to multiple other devices and multiple other content items, as discussed in detail below. The terms "book," "electronic document," and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms book, electronic document, and/or eBook may include any content that is in electronic or digital format.

With such eBooks, the content may be structured as virtual frames presented on the device and a user may turn or change from one virtual frame or "page" of electronic content to another. Furthermore, within the context of this discussion, the term "bookmark" refers to a specified location within or portion of the eBook. Bookmarks may include location marks, notes, searches, data accesses, chapters, segments, tracks, sections, topical headings, indices, and so forth which are associated with a specified location. For example, a bookmark may comprise a specific location within the content where a user accessed a resource such as a website, retrieved data from a database, looked up a word in a dictionary, and so forth. The bookmark may comprise the specific location and other details as well, such as note text, highlighted areas, words which appeared in the search, metadata associated with the data access, and so forth.

Through use of the touch sensor, users are permitted to intuitively navigate through eBooks rendered on the example tablet device by utilizing bookmarks and touch interaction. Such navigation, among other benefits, provides the user with the experience of interacting with their electronic book as if it were a printed physical book.

Aspects of the edge navigation techniques may be adopted for use in other content items, such as video items, multimedia items, and so forth. The term "bookmark" in these scenarios describes locations within these forms of items, such as frames, thumbnails, video clips, still images, scenes, and so forth. Furthermore, various aspects and features described herein may be implemented in other electronic devices besides tablet devices including, for example, electronic book readers, portable computers, personal digital assistants (PDAs), portable gaming devices, wireless phones, desktop computers, and so forth.

Illustrative Electronic Device

FIG. 1 illustrates an example electronic device architecture 100 that may utilize an edge navigation module. In one possible implementation, the architecture includes a tablet device 102(1), although other electronic devices may similarly implement the described modules and techniques. For instance, a personal digital assistant 102(2), a laptop computer 102(3), a smartphone 102(4), a desktop computer 102 (D), or any other electronic device may also implement edge navigation.

In the illustrated example, the electronic device 102 includes a touch sensor. In some implementations, the touch sensor detects a magnitude of force impressed upon the sensor, as well as the presence or absence of a touch. Thus, the touch sensor can provide three-dimensional input by detecting where on the screen pressure is applied (i.e., x-dimension and y-dimension) and the amount of pressure applied to that point (i.e., z-dimension). Thus, the same pressure applied to different points on the surface of the touch-screen (e.g., lower-left hand corner or upper-right hand corner) generates different input signals as well as different pressure applied to the same point on the surface of the touch-screen (e.g., hard versus soft pressure on a point on the screen).

Duration may further differentiate user input via the touch sensor. In some implementations, input signals differ based on the amount of time that the touch sensor detects pressure. Duration or time of contact may be thought of as providing an alternative third dimension (i.e., time of contact is the z-dimension instead of pressure) or time may supply a fourth dimension in addition to pressure (i.e., x-dimension, y-dimension, pressure, and time). Various pressure and durations (e.g., a short, hard pressure; a short, soft pressure; a long, hard pressure; and a long, soft pressure) may all correspond to a different commands or inputs.

In addition to pressure at a single point, the touch sensor may discern a force applied to an area. In some implementations, the force is calculated by summing the pressure detected at several points. For example, a user's thumb may contact several pressure sensors simultaneously due to the size and shape of a thumb. In this example, the pressure detected by each of the sensors contacted by the thumb may be summed to determine a total magnitude of force.

As shown in this implementation, the tablet device 102(1) includes a touch-screen display 104. The device 102 may also include a keyboard or other types of actuatable elements that may have dedicated or assigned operations. For instance, the tablet 102(1) may have a power on/off button 106, selection keys, joystick, touchpad, and so forth.

The touch-screen display 104 presents content in a human-readable format to a user. The touch-screen display 104 may depict, for example, text of the eBooks, along with illustrations, tables, or graphic elements that might be contained in the eBooks. In some cases, the eBooks may include multimedia components, such as video or audio. In such scenarios, the display 104 may also be configured to present video, and the device 102 may be equipped with audio output components to play audio files.

The touch-screen display 104 is implemented with touch-sensitive technology that is responsive to user input registered via, for example, a finger, a stylus, or other similar pointing device. For convenience, the touch-screen display 104 is shown in a generally rectangular configuration. However, the touch-screen display 104 may be implemented in any shape, and may have any ratio of height to width. Also, for stylistic or design purposes, the touch-screen display 104 may be curved or otherwise non-linearly shaped.

In some implementations, the touch-screen display 104 may be implemented using liquid crystal displays ("LCDs"), electrophoretic or electronic paper display technology and so forth. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some example electronic paper displays that may be used with the implementations described herein include bi-stable LCDs, microelectromechanical system, cholesteric, pigmented electrophoretic, interferometric, and others.

In the same or different implementations, the touch-screen display 104 may be a flexible display. The touch sensor(s) may include a resistive touch sensitive film. The flexible display may also include a protective layer made of a flexible material such as plastic. The flexible display may also include a flexible backplane layer. The backplane may also be made of a flexible material, such as plastic, metal, glass or a polymer based material. A flexible backplane may be bendable, rollable, light-weight, etc. In one configuration, the flexible backplane is a matrix backplane on a plastic substrate.

The electronic device 102 has various internal components 108. The components may comprise one or more processors 110, memory 112, and so forth. The memory 112 comprises a computer readable storage medium, such as volatile or non-volatile memory. Instructions stored within the memory 112 may be executed upon the one or more processors 110.

Figure 3:
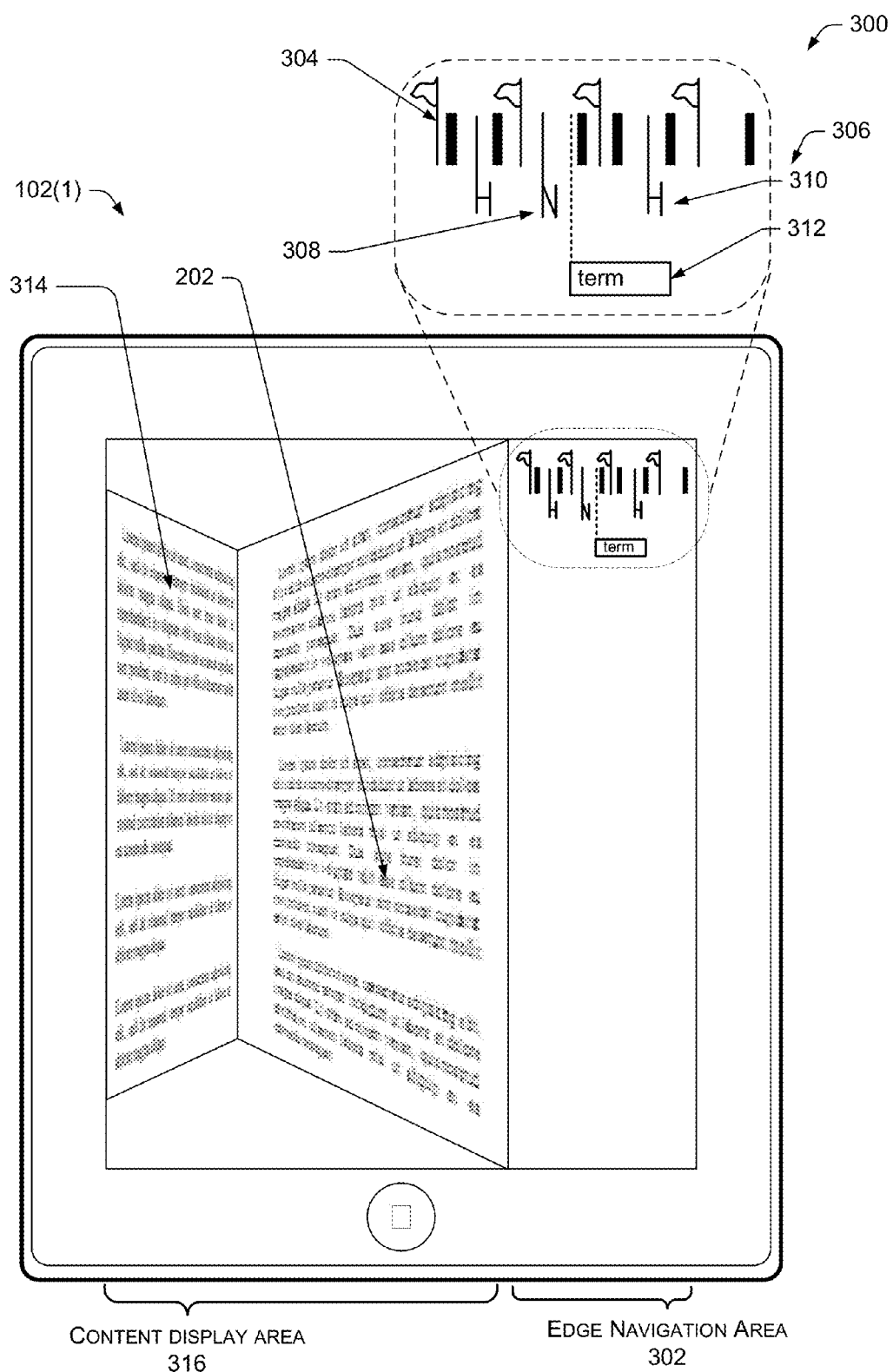
FIG. 3 is a view of a UI of the tablet device after transitioning to the edge navigation mode.

The device 102 may store one or more digital content items, such as eBooks 114, within the memory 112. The memory 112 also stores a reader application 116 configured to present the eBooks 114 on the device, as well as an edge navigation module 118. The edge navigation module 118, as described below with regards to FIG. 3, provides a graphical representation of bookmarks within the content. The graphical representation may be configured to simulate looking at the edge of a printed book, with associated bookmark indicia. Thus, a user is able to select bookmarks based at least in part upon their apparent location within the body of the content. For example, a user may be looking for, and easily find, a bookmark containing a note "about three-quarters of the way through the book."

Components 114-118 may be implemented in software, firmware, hardware, or a combination. For software of firmware, the components are provided as computer-readable instructions stored in a computer readable medium, such as the memory 112.

Illustrative User Interfaces

Figure 2:
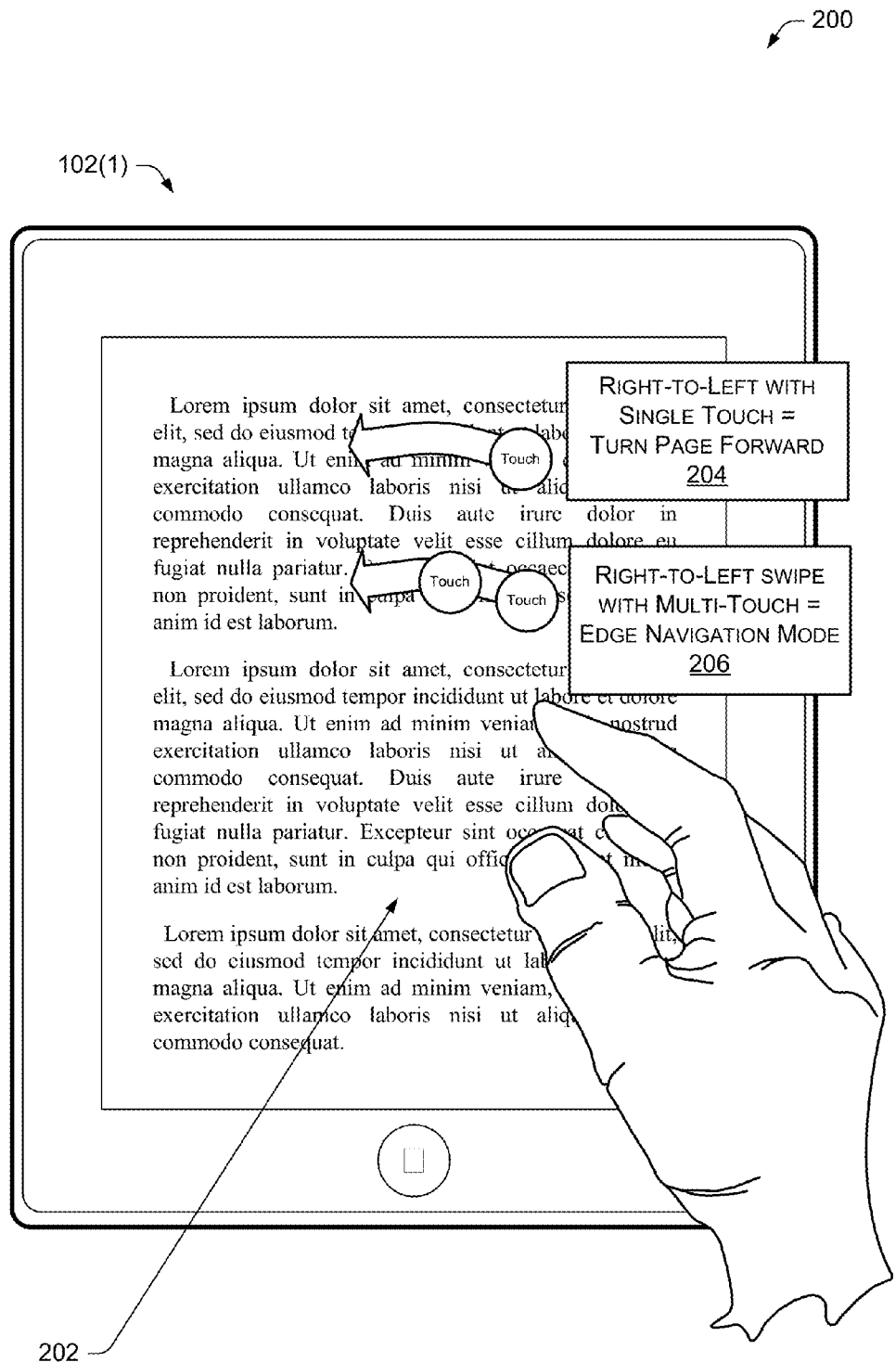
FIG. 2 is a view of a user interface ("UI") of the tablet device of FIG. 1, which depicts a normal mode of presenting a content item (here, an electronic book) and an example gesture associated with engaging an edge navigation mode.

FIG. 2 shows a user interface ("UI") representation 200 presented on the touch-screen display 104 of the handheld tablet device 102(1). The UI 200 shows a page of text 202 from an eBook, which is represented by pseudo-Latin words in a reading mode or normal mode of operation. The pages may be turned via contact with the touch-screen display 104 or through use of the keyboard or other actuatable elements. In addition to touch location, pressure on the touch-screen display 104 by an object such as the reader's finger or a stylus may cause the tablet device 102 to display a different page analogous to turning a page of a physical book. Thus, as shown by 204, the user may thus turn to a next page by using a single touch and slide of their finger right-to-left. Similarly, a single touch and slide left-to-right may turn to a previous page. This allows the user to experience an interaction with the electronic book which is similar to that provided by a physical book.

Recall from above that a "page" may be understood as a virtual frame of the content, or a visual display window presenting the content to the user. The pages presented and turned on the tablet device 102 may not correspond directly to pages in the associated physical book. Depending on display capabilities, font size, and other such parameters, any given "page" displayed on the tablet device 102 may contain more or less text/graphics than the corresponding hard page. Thus, the pages are turned in the sense of changing from one display frame to another. A visual representation of a "page," such as a page number or location identifier, may assist the user in distinguishing one page from another. Audio and/or haptic feedback may also be used to provide an indication of pages turning. For example, a sound of actual paper pages of a book being turned could be played each time the "page" of an eBook is turned.

Multi-touch (or two or more simultaneous or coincident points of pressure on the touch-screen display 104) may also be used to initiate actions. For instance, a user may transition the device 102 to an edge navigation mode provided by the edge navigation module 118 using a multi-touch input. As shown in this illustration, a right-to-left swipe with two fingers 206 while in the reading mode may engage the edge navigation mode, as described next.

FIG. 3 is a view of a UI 300 of the tablet device 102(1) after the device 102(1) transitions to the edge navigation mode. For ease of illustration only, the presentation of the edge navigation mode may be considered as analogous to turning a book that a user reads such that the user views an unbound edge of the book. In some instances, the unbound edge of this book may include visible bookmarks or tabs.

For instance, the edge navigation area 302 may be presented as a virtual edge, simulating the edge of a physical book. One or more dimensions of this virtual edge may be proportionate to the size or length of the content item and the relative position within the content item. This virtual edge may contain one or more bookmark indicia. Each of the bookmark indicia are associated with a particular bookmark. As described above, bookmarks may include location marks, notes, searches, data accesses, chapters, segments, tracks, sections, topical headings, and so forth which are associated with a specified location in the content. These indicia may include different marks, icons, symbols, regions of haptic feedback, and so forth to denote the associated bookmark.

One or more dimensions of the edge navigation area 302 as presented on the display 104 may be proportionate, at least in part, to the relative position within the content item and the overall length or size of the content item. For example, where the content item is a book, a user at the beginning of a book upon engaging the edge navigation mode may see the edge navigation area 302 for a book having 100 pages as being narrower than the edge navigation area 302 for a book having 700 pages. Likewise, when the user is toward the end of the 700 page book and engages the edge navigation mode, a narrower edge navigation area 302 representing the remainder of the book would be presented.

As shown here, a flag 304 icon represents a location mark, indicating a point of interest within the content. This may be considered equivalent to a user placing a ribbon or piece of paper in between the pages of a physical book to more easily return to that location at a later time. In this example, there are four flagged areas of the book.

The presence of chapters 306 are indicated with solid rectangles in this example, although other implementations may use different visual markers. Thus, in this illustration the book comprises six chapters. Similarly, the edge navigation mode identifies highlights 310 with a thin vertical line and the letter "H." A highlight comprises a selected portion of the content. FIG. 3 also illustrates that the edge navigation mode may also identify one or more notes 308, indicated with a thin vertical line and the letter "N" in this example. While a few example bookmark indicia have been discussed, other implementations may employ different types indicia with use of different types of symbols.

The edge navigation mode UI 300 may also provide details of other events that have occurred within the content. For instance, the UI 300 illustrates a search term 312, along with the location of where the user conducted the search for that term took within the content.

The one or more bookmark indicia may be arranged spatially relative to one another based at least in part upon their relative positions within the electronic book. For example, suppose the first flag 304 references a location in a preface to the book. When read left to right, the first flag 304 thus comes before chapter one in the book. Similarly, the note 308 is located about halfway through chapter two.

The edge navigation mode may provide a simulated perspective view of a physical book, as shown here. Thus, the UI 300 presents the page 202, along with an adjacent previous page 314, appearing to come together where they may be bound in a physical book in a content display area 316. This content display area may be adjacent to the edge navigation area 302. This visual layout is just one example implementation. The bookmark indicia may be arranged in other places in the UI 300, such as cascading down the edge navigation space. Further, other shapes, icons, symbols, and so forth may represent the bookmarks.

Furthermore, while one edge navigation area 302 is depicted in this disclosure, the edge navigation area 302 may be presented on both sides of the content display area 316. For example, a user may enter the edge navigation mode while in about the middle of a book, and an edge navigation area 302 would be presented for the portions of the book before and after that section on the left and right sides, respectively.

Figure 4:
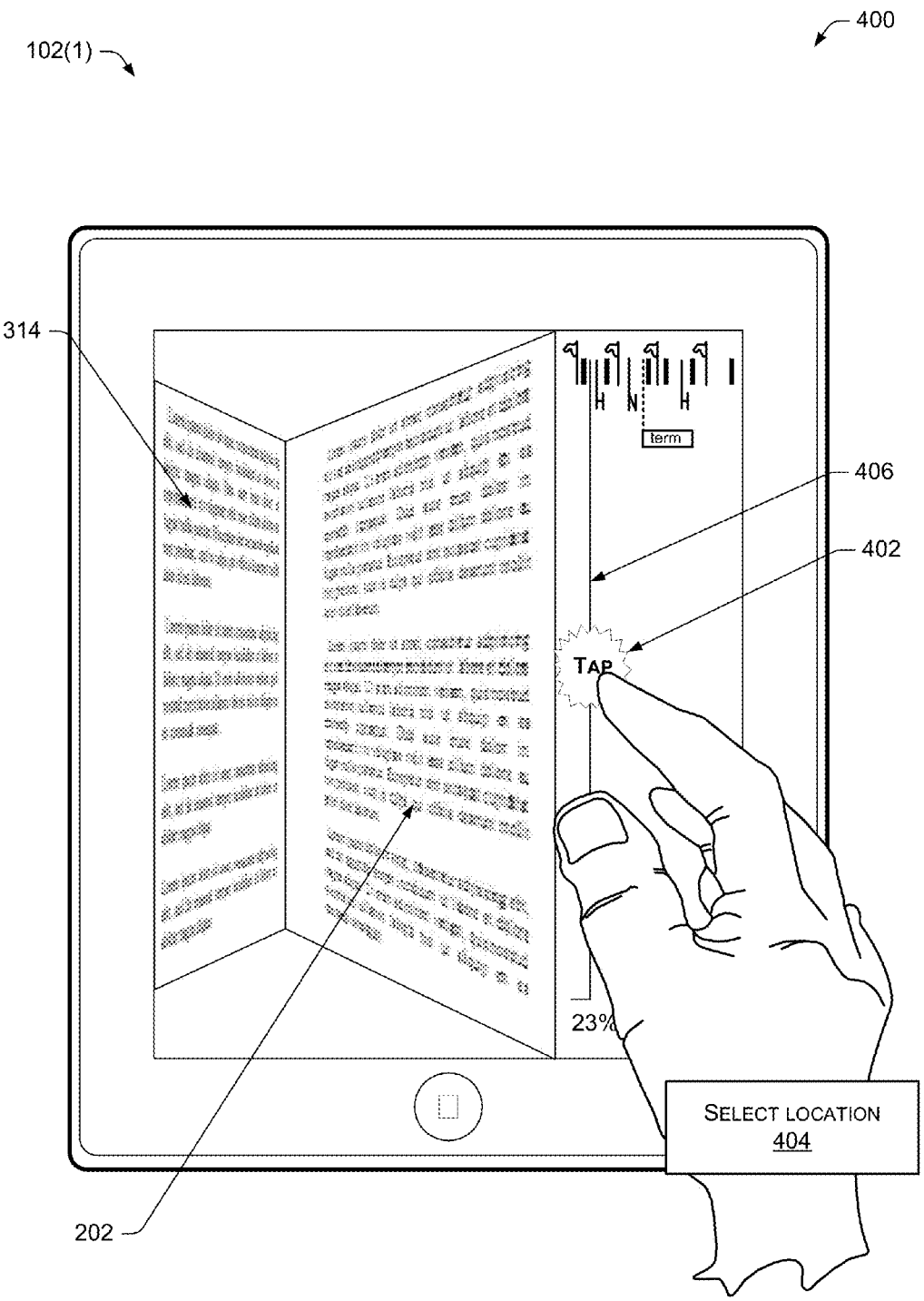
FIG. 4 is a view of a UI of the tablet device when a user selects a bookmark within the electronic book while the device is in the edge navigation mode.

FIG. 4 is a view of a UI 400 of the tablet device when the device 102 is in the edge navigation mode when a user selects a bookmark. As shown in this illustration, the user has entered a tap 402 within the edge navigation area 302 to select a bookmark. The edge navigation module 118 compares the coordinates of this tap, and is configured to snap the selection to the closest adjacent bookmark 404. In this illustration, a snap indicator 406 in the form of a vertical line extends down from the snapped bookmark, in this case the first highlight 310. The snap indicator 406 provides a visual confirmation to the user that the input was received, as well as providing a reference as to which bookmark was selected. The snap indicator 406 may also present a relative position in the content, such as 23% into the book as shown here.

While FIG. 4 illustrates selection of a location within the electronic book by snapping to a nearest bookmark, other implementations may select locations without references to corresponding bookmarks. For instance, some implementations may employ an edge navigation mode UI that does not include bookmarks, but instead visually illustrates the pages of the book from the perspective of the unbound edge. The user may then select any location on this unbound edge (e.g., 25% of the way into the thickness of the book) and, in response, the edge navigation module 118 may snap to the corresponding "page" of the electronic book.

Figure 5:
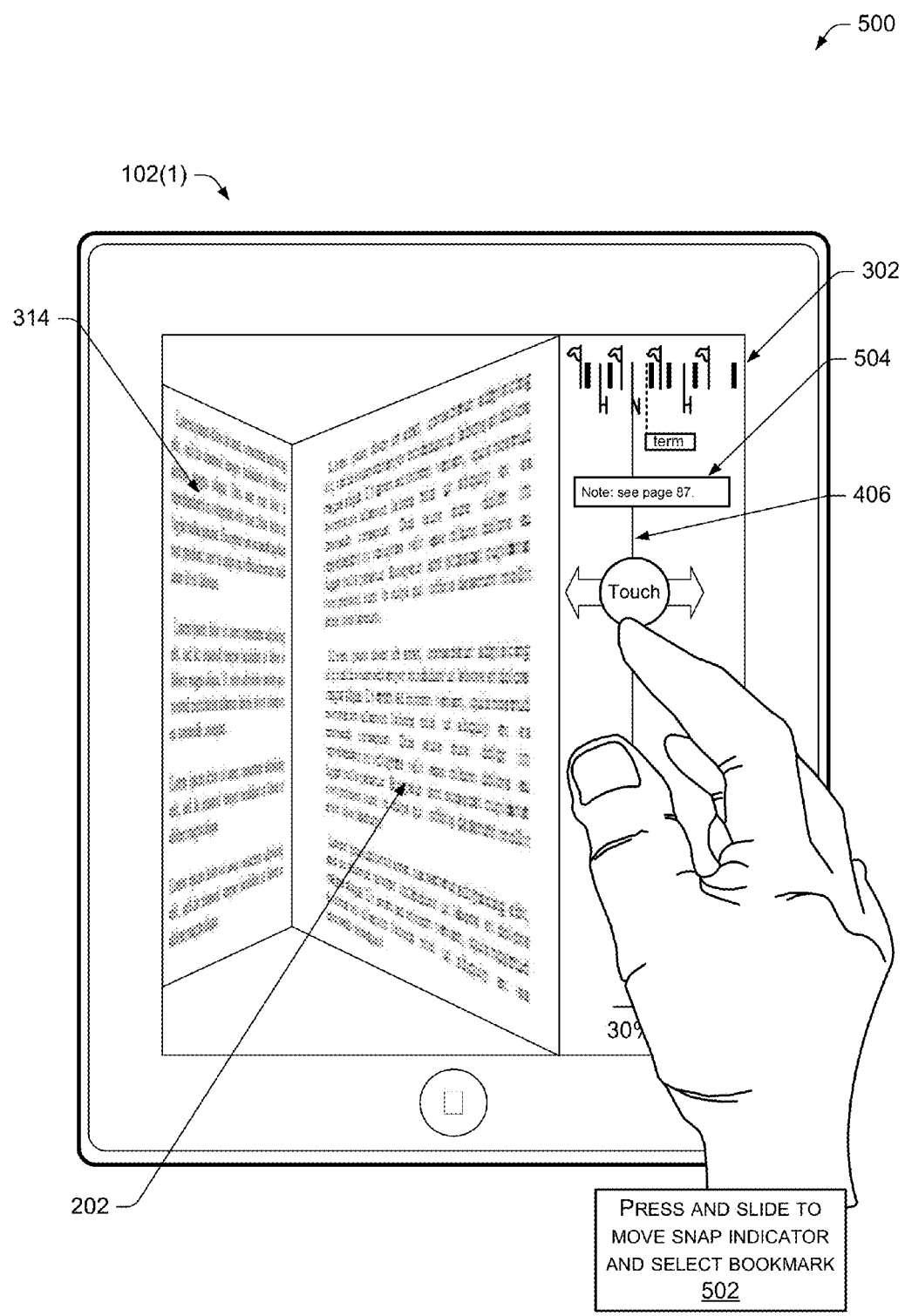
FIG. 5 is a view of a UI of the tablet device when the device is in the edge navigation mode and the user slides to select between different bookmarks within the electronic book.

FIG. 5 is a view of a UI 500 of the tablet device 102(1) when the device 102(1) is in the edge navigation mode and when the user slides to select between different bookmarks. As shown here, the user has touched within the edge navigation area 302, and may slide their finger left and right to select different bookmarks 502. As the slide continues, the snap indicator 406 may be configured to jump to the next bookmark. Once a desired bookmark has been selected, the user may enter another gesture to open to the bookmarked location.

In some implementations, a magnified view, or summary window of at least a portion of the currently selected bookmark may be presented. Such a view facilitates user selection of one bookmark when there are a large number present and the display may become cluttered. In this illustration, the note 308 is enlarged and presented to the user, as shown at 504. Also, the UI may illustrate the relative position of the selected bookmark in the book relative to the entirety of the book adjacent to the snap indicator 406. Here, for instance, the selected bookmark appears 30% of the way through the book.

Figure 6:
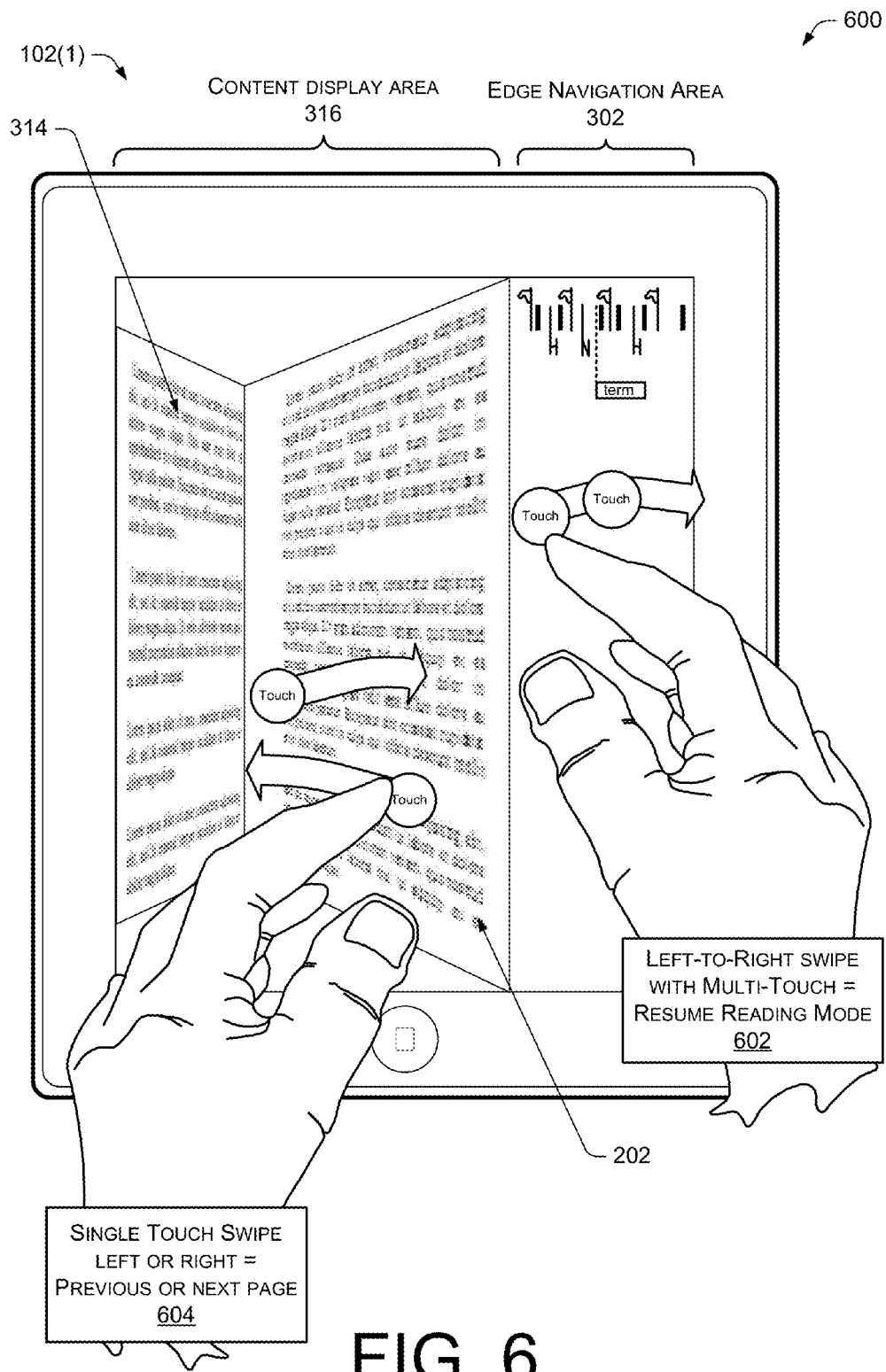
FIG. 6 is a view of a UI of the tablet device and an example gesture associated with disengaging the edge navigation mode.

FIG. 6 is a view of a UI 600 of the tablet device when the device 102(1) is in the edge navigation mode. While the edge navigation mode is engaged, user input may be used to control presentation of content on the display 104.

For instance, a user may disengage the edge navigation mode and resume a reading mode by using a gesture that is a mirrored opposite of that used to enter the edge navigation mode. For example, and as described above with respect to FIG. 2, the user may perform a right-to-left multi-touch swipe 206 within the edge navigation area 302 to engage the edge navigation mode shown in FIG. 6. To disengage the edge navigation mode, the user may perform a left-to-right multi-touch swipe 602.

While in the edge navigation mode, the user may also change pages one by one by gesturing within the content display area 316. A single touch swipe left or right 604 may be configured to present a previous or next page, respectively, while maintaining the perspective view provided by the edge navigation mode. In some implementations, the single touch swipe left or right may disengage the edge navigation mode and transition to a normal reading mode.

Figure 7:
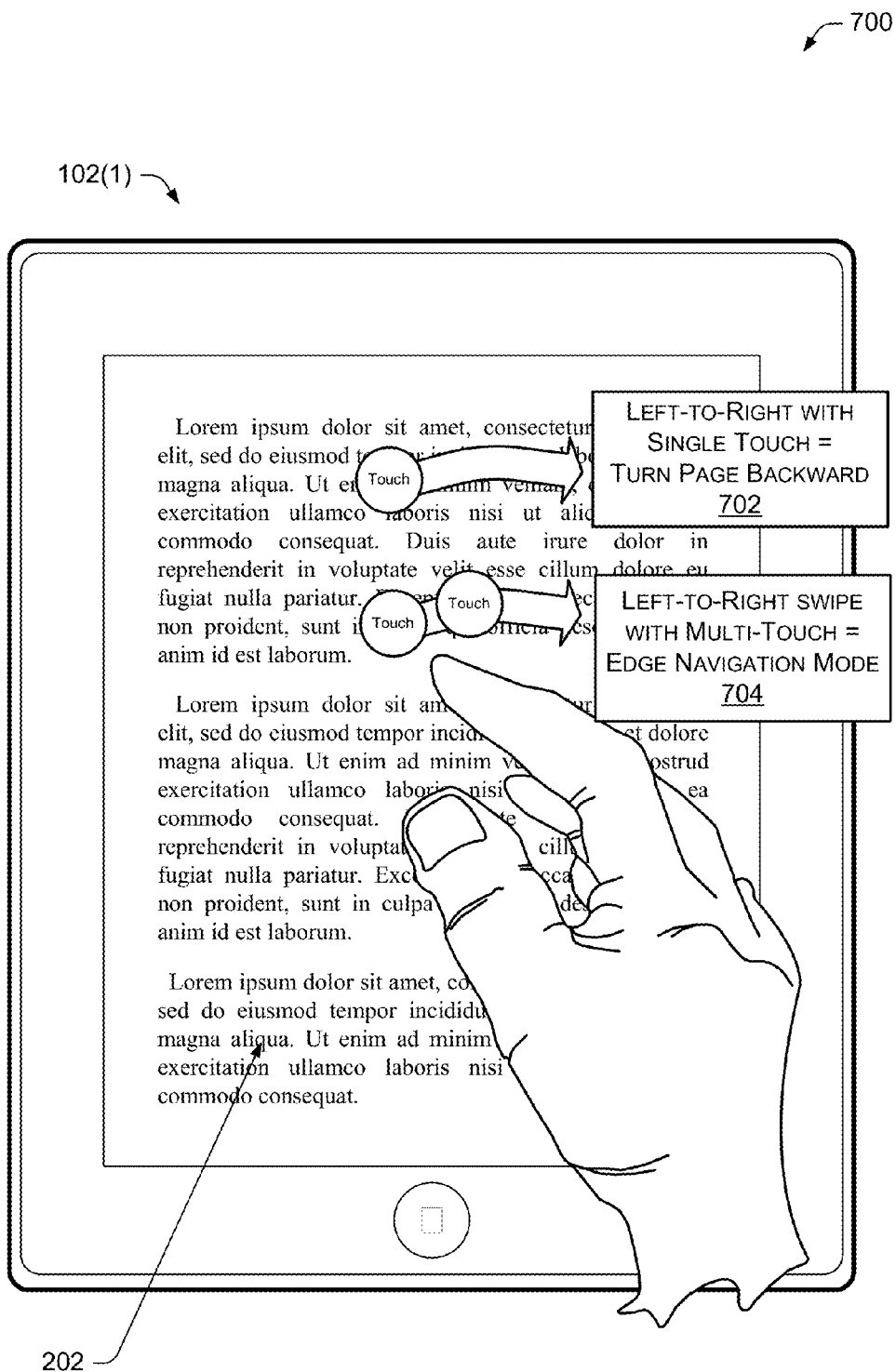
FIG. 7 is a view of a UI of the tablet device, which depicts the normal mode of presenting a content item and another example gesture associated with engaging an alternate edge navigation mode.

FIG. 7 is a view of a UI 700 of the tablet device 102(1), which depicts the normal mode of presenting the page 202 of the content item. Similar to that described above with respect to FIG. 2, a user may navigate between pages or may engage the edge navigation mode. Thus, the user may use a single touch and slide of their finger left-to-right 702 to turn to a previous page. Likewise, the user may use a multi-touch left-to-right swipe 704 to enter an alternate presentation of the edge navigation mode 704.

Figure 8:
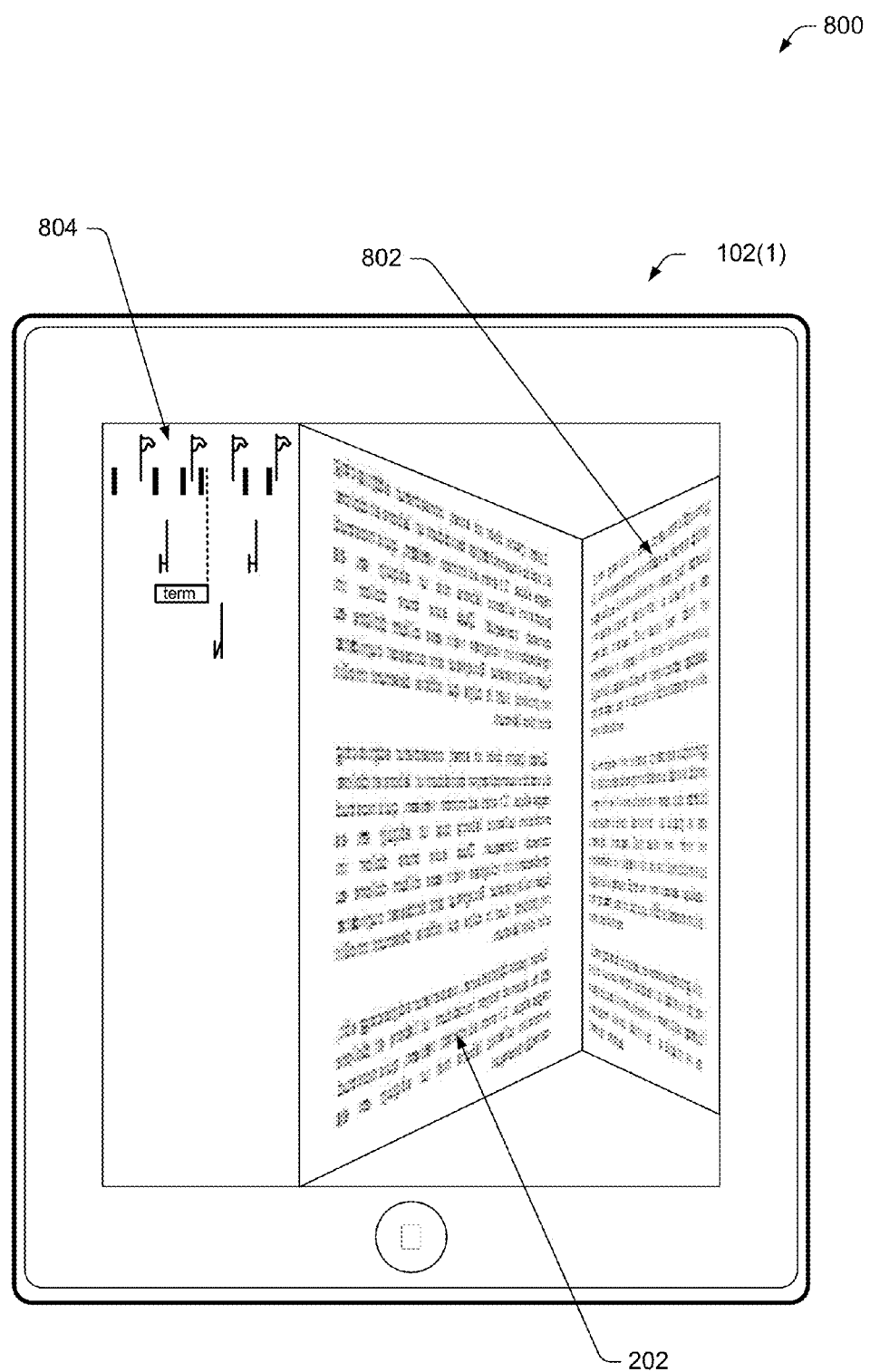
FIG. 8 is a view of a UI of the tablet device after the device transitions to the alternate edge navigation mode.

FIG. 8 is a view of a UI 800 of the tablet device 102(1) when the device 102(1) is in the alternate edge navigation mode engaged via the gesture shown in FIG. 7. In this alternate edge navigation mode, the page 202 that was presented on the display 104 appears on the left of the display, while a next page 802 appears to the right. Thus, the effect such as manipulating pages in a physical book, is maintained.

In some implementations, the edge navigation area 302 may use an alternate arrangement 804 of the bookmark indicia. For example, as shown here, the different categories of bookmarks cascade down the edge display area 302, providing a spatial separation and decluttering the bookmarks for presentation to the user. As shown here, the flags 304 appear at the top of the edge navigation area 302, the chapters 306 just below, the highlights 310 below that, the search term 312 below that, and the note 308 in the bottommost position. Other implementations may employ other such arrangements.

Figure 9:
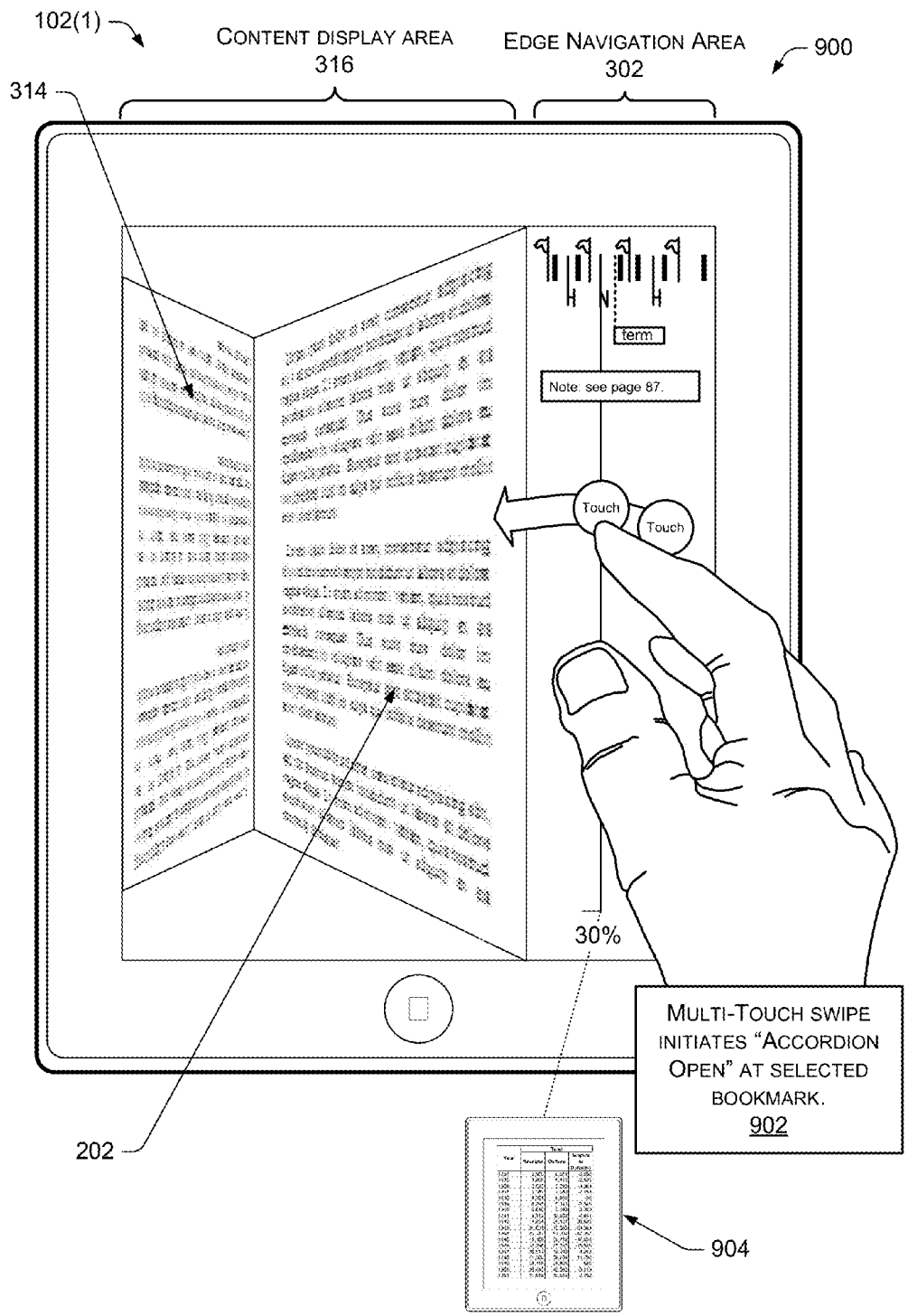
FIG. 9 is a view of a UI of the tablet device when the device is in the edge navigation mode and a user selects a bookmark to transition to an accordion view.

FIG. 9 is a view of a UI 900 of the tablet device 102(1) when the device 102(1) is in the edge navigation mode and when a user selects a bookmark and engages an accordion view. For some content items, such as electronic books, users may desire to flip between multiple locations within content. For example a user may wish to flip between a page of text on a first page and a table on a second page within an electronic book. The accordion view provides a similar experience, as discussed below.

While the edge navigation mode is engaged, the user may perform a horizontal multi-touch swipe 902 within the edge navigation area 302 to initiate an accordion open. In this example, the swipe is right-to-left, thus emulating the user flipping open the book to access a page 904 associated with the selected bookmark later in the book. Other implementations may employ any other gesture to implement this accordion view.

Figure 10:
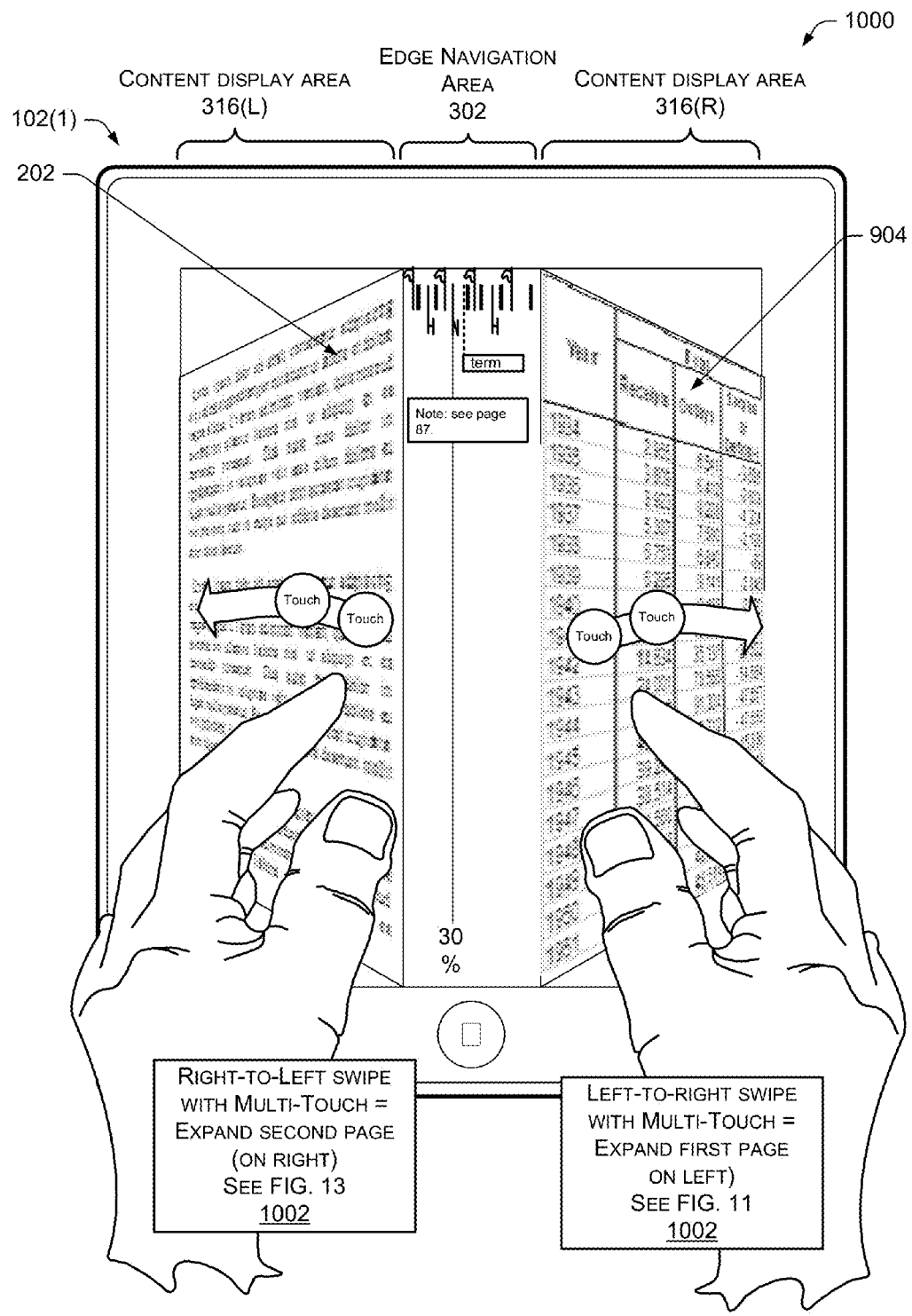
FIG. 10 is a view of a UI of the tablet device after the device transitions to the accordion view of the edge navigation mode. This figure also illustrates some example gestures to modify the presented data.

FIG. 10 is a view of a UI 1000 of the tablet device 102(1) when the accordion view of the edge navigation mode is engaged. In the accordion view, the page 202 presented when the edge navigation mode was initially engaged is shown to the left of the edge navigation area 302 in a content display area 316(L), while the page 904 associated with the bookmark is also presented in a content display area 316(R). As shown here, the presentation may be such to simulate the user holding a physical book and flipping between two or more locations.

The user may input several gestures to alter the presentation of the pages on the display 104. A right-to-left multi-touch swipe within the content display areas 316 expands the second page 904 to occupy a greater portion of the display 104 than the first page 202. Similarly, a left-to-right multi-touch swipe expands the first page 202 to occupy a greater portion of the display 104 than the second page 904. Thus, the user may adjust the display to see both pages, akin to moving a physical book back and forth to change the point of view.

Figure 11:
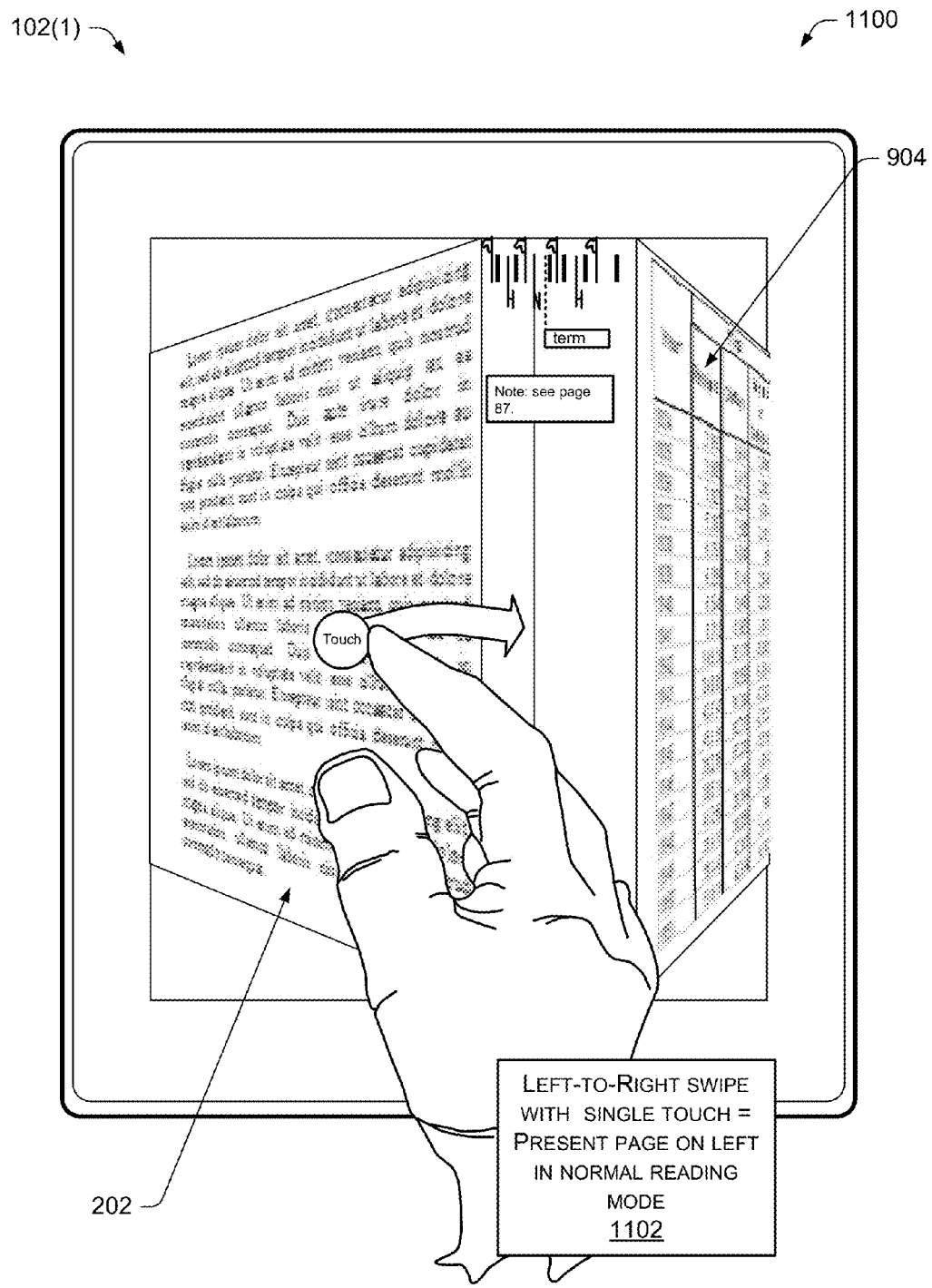
FIG. 11 is a view of a UI of the tablet device when the tablet device is in the accordion view and the user has requested to emphasize a first page.

FIG. 11 is a view of a UI 1100 of the tablet device 102(1) when the accordion view of the edge navigation mode is engaged and the user has requested to emphasize the first page 202. Once the user has emphasized a page so that occupies a greater area than the other page(s), the user may wish to resume a normal mode (e.g., a reading mode). A left-to-right swipe with single touch 1102 thus initiates a command for the device to present in normal mode the left-most first page 202, which occupies a greater portion of the display 104 than the second page 904.

Figure 12:
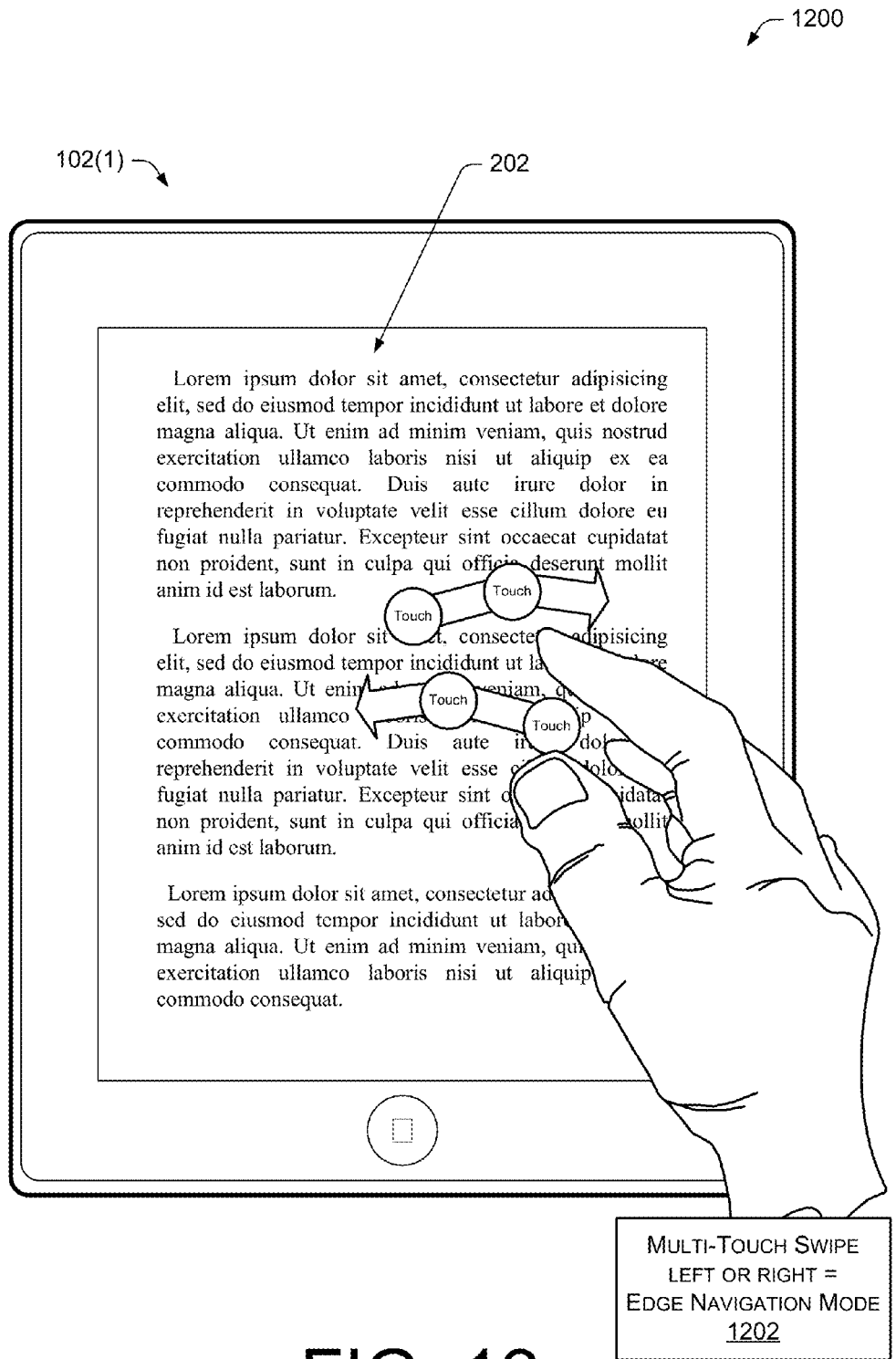
FIG. 12 is a view of a UI of the tablet device after the device returns to the normal mode for presenting the emphasized first page.

FIG. 12 is a view of a UI 1200 of the tablet device after disengaging the edge navigation mode and returning to the normal mode illustrating the emphasized first page 202. As before, a multi-touch swipe to the left or right 1202 will initiate an entry into the edge navigation mode 1202.

Figure 13:
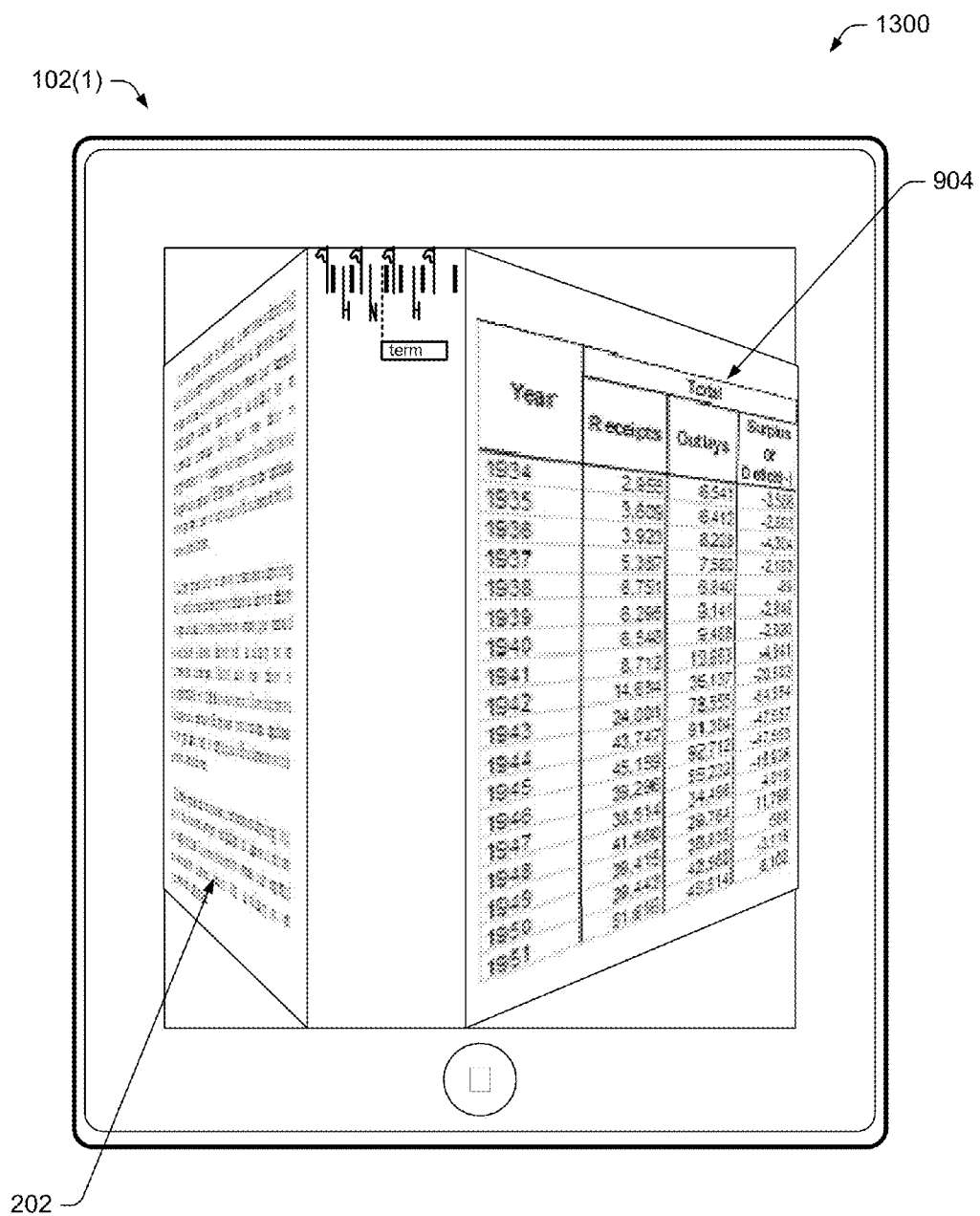
FIG. 13 is a view of a UI of the tablet device when the device is in the accordion view of the edge navigation mode and the user has requested to emphasize a second page.

FIG. 13 is a view of a UI 1300 of the tablet device when the accordion view of the edge navigation mode is engaged and the user has emphasized the second page 904. In this view, the second page 904 occupies a greater area on the display 104 than the first page 202. Similar to that described above with regards to FIG. 11, a multi-touch swipe from right-to-left disengages the edge navigation mode and initiates a normal mode showing the second page 904. While FIGS. 11 and 13 illustrate example manners for emphasizing respective portions of a content item, other implementations may do so in any other way.

Illustrative Processes of Edge Navigation

Figure 14:
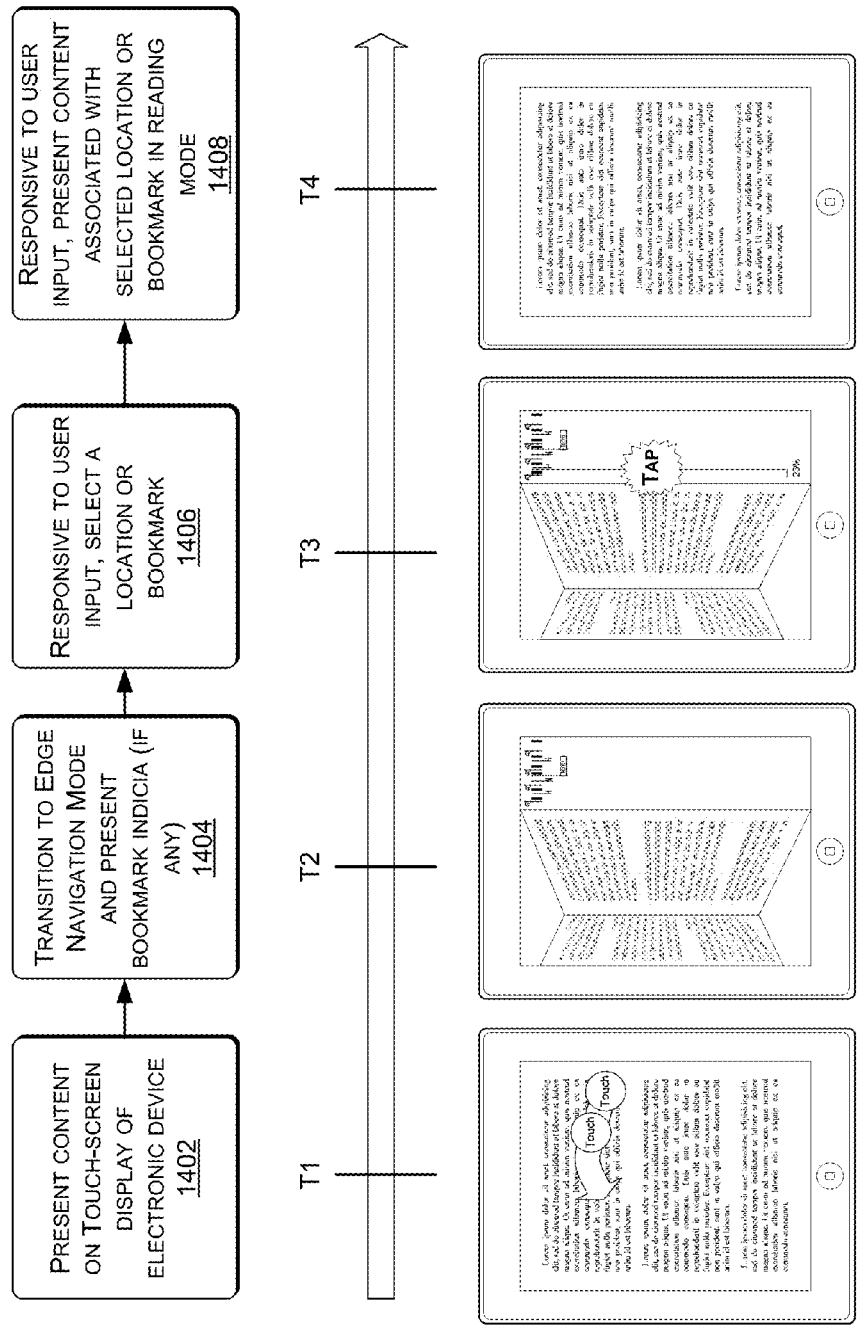
FIG. 14 is a flow diagram illustrating an example process and scenario of using edge navigation to select a bookmark within the electronic book.
Figure 15:
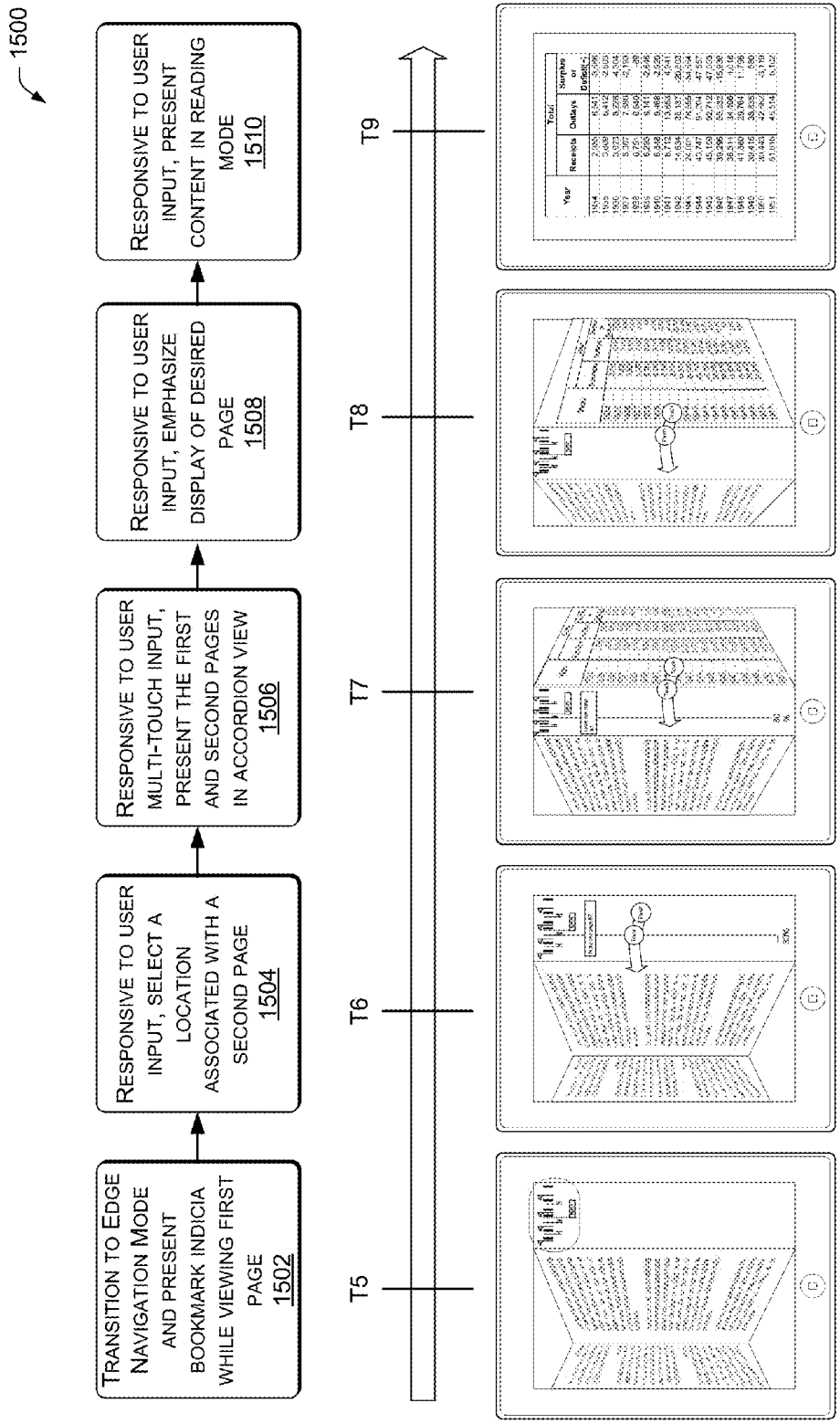
FIG. 15 is a flow diagram illustrating an example process and scenario of using edge navigation and an accordion view to navigate within the electronic book.

FIGS. 14 and 15 illustrate example processes 1400 and 1500 that may be implemented by the architecture and user interfaces of FIGS. 1-13 or by other architectures or interfaces. These processes are illustrated as a collection of blocks in a logical flow graph, which represent a sequence of operations that can be implemented in hardware, software, or a combination thereof. In the context of software, the blocks represent computer-executable instructions stored on computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 14 is a flow diagram illustrating an example process and scenario 1400 of using edge navigation to select a bookmark within an eBook. At time T1, the tablet device presents content on the touch-screen display 1402. The user, looking for a particular page which she bookmarked or otherwise looking to view a later page in the book, uses a multi-touch horizontal swipe to initiate the edge navigation mode.

At T2, the tablet device transitions to the edge navigation mode, and presents a virtual edge view 1404, which may contain one or more bookmark indicia. At T3, the tablet device, responsive to a user input, selects a location or a bookmark 1406. As described above, the user may tap to a particular location, or slide their finger to move amongst the bookmarks to select a desired location or bookmark. At T4, responsive to user input, the tablet device presents the portion of the eBook designated by the bookmark in the reading mode 1408. The user may now read the page referenced in the bookmark she selected.

FIG. 15 is a flow diagram illustrating an example process and scenario 1500 of using edge navigation and an accordion view to navigate within the eBook. Suppose the user of FIG. 14 has continued reading the first page, and decides to move to another bookmark within the eBook. The user engages the edge navigation mode as described above, and at T5 the tablet device transitions to the edge navigation mode and presents the bookmark indicia 1502 to the user.

At T6, responsive to user input, select a location or a bookmark associated with a second page. This desired bookmark is in turn associated with a second page within the eBook. Suppose in this scenario that the user wishes to view the current, first page, while also seeing the second page. For illustration, consider the situation of a user of a physical book placing a finger at a first location in the book, while using a second finger to hold a second page which they wish to reference. The user may thus easily flip back and forth between the first and second pages.

At T7, responsive to a user multi-touch input, the first and second pages are presented in an accordion view 1506. This multi-touch input may comprise the user performing a multi-touch swipe after selection of the bookmark. For example, as shown here, the visual representation places the edge navigation area 302 on the right side of the display 104. To maintain consistency with the visual representation, the accordion view may be initiated by a right-to-left multi-touch swipe.

At T8, responsive to user input, the second page is emphasized on the display 1508. This may occur, for example, when the user wishes to take a closer look at the second page to determine if that indeed is the portion of the eBook she is looking for.

At T9, responsive to user input, the tablet device presents the eBook in reading mode 1510. In this example, where the second page was emphasized in the accordion view, a continued multi-touch swipe from right-to left may be used to initiate the transition to reading mode showing the second page.

CONCLUSION

The discussion above describes various actions in response to touch contact. However, many alternative or additive gesture techniques may be used. For instance, gesture techniques such as press-and-hold, press-and-slide, swipe, application of varying amounts of pressure, tap, sequences of contacts, multi-touch, and the like may be used to operate the device. Further, the number of touch points or coincidentally touched locations used in any given gesture may alter the input and, hence, the output provided by the device.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented method comprising:
    under control of an electronic device configured with specific executable instructions,
    displaying a first page of an electronic book on a touch-screen display of the electronic device in a reading mode of operation, wherein the electronic book includes a total number of pages;
    while the electronic device is operating in the reading mode, detecting user input via the touch-screen display;
    determining whether to transition the electronic device from the reading mode to an edge navigation mode of operation based at least in part on whether the user input includes a single touch input or a multi-touch input;
    in response to determining that the user input includes multi-touch input associated with a substantially horizontal swiping motion, transitioning the electronic device from the reading mode of operation to the edge navigation mode of operation, the edge navigation mode of operation depicting a virtual edge of the electronic book, the virtual edge having one or more dimensions proportionate to, at least in part, the total number of pages of the electronic book and a location of the displayed first page determined with respect to the total number of pages of the electronic book, wherein:
        the virtual edge is displayed to the right of the displayed first page when the substantially horizontal swiping motion includes a multi-touch right-to-left swiping motion; and the virtual edge is displayed to the left of the displayed first page when the substantially horizontal swiping motion includes a multi-touch left-to-right swiping motion; and responsive to user selection of a location within the virtual edge, displaying a second page of the electronic book on the touch-screen display associated with the selected location.

2. The computer-implemented method of claim 1, wherein the depicting of the virtual edge of the electronic book provides an appearance of viewing an edge of a physical book.

3. The computer-implemented method of claim 1, wherein the user selection of the location comprises a tap gesture.

4. The computer-implemented method of claim 1, wherein the user selection of the location comprises a touch and slide.

5. The computer-implemented method of claim 1, further comprising:

while the electronic device is operating in the edge navigation mode, detecting a second user input via the touch-screen display; and transitioning the electronic device back to the reading mode of operation in response to determining that the second user input comprises a horizontal swiping motion of two or more coincident touches upon the touch-screen display.

6. The computer-implemented method of claim 1, further comprising redisplaying the first page of the electronic book in the reading mode of operation responsive to at least one of a second user input received via the touch-screen display or an elapsed period of time.

7. The computer-implemented method of claim 1, wherein the virtual edge further presents one or more bookmark indicia, the one or more bookmark indicia representing one or more corresponding bookmarks placed in the electronic book.

8. The computer-implemented method of claim 7, wherein the depicting the one or more bookmark indicia comprises displaying one or more marks or icons to represent bookmarks previously placed in the electronic book, the one or more marks or icons arranged spatially relative to one another based at least in part upon their relative positions within the electronic book.

9. The computer-implemented method of claim 7, wherein the bookmarks comprise location marks, notes, searches, data accesses, chapters, segments, tracks, sections, or topical headings associated with a specified location.

10. The computer-implemented method of claim 7, further comprising providing a chapter number or location identifier in association with each of the one or more bookmark indicia.

11. A computer-implemented method comprising:

under control of an electronic device having a touch sensor and configured with specific executable instructions, while the electronic device presents a first page of an electronic book on a display of the electronic device in a reading mode, detecting user input via the touch sensor;

determining whether to transition from the reading mode to an edge navigation mode based at least in part on whether the user input includes a single touch input or a multi-touch input associated with a substantially horizontal swiping motion in a direction from a first side of the first page toward a second side of the first page;

in response to determining that the user input includes multi-touch input associated with the substantially horizontal swiping motion, presenting the electronic book in the edge navigation mode, the edge navigation mode showing a representation of the first page adjacent to the first side of the first page, and depicting a virtual edge of the electronic book having one or more dimensions proportionate to, at least in part, a total number of pages of the electronic book and a location of the first page determined with respect to the total number of pages of the electronic book;

receiving via the touch sensor a selection of a second page of the electronic book; and presenting on the display a representation of the second page while concurrently presenting the representation of the first page.

12. The computer-implemented method of claim 11, further comprising:

responsive to receiving user input, altering the presentation of the representation of the first and second pages such that the first page fills a greater portion of the display than the second page.

13. The computer-implemented method of claim 11, wherein the first and second pages are presented in a perspective view to provide an appearance of viewing an edge of a physical book.

14. The computer-implemented method of claim 11, wherein the user input comprises a touch proximate to a snap region associated with a bookmark within the electronic book.

15. An electronic device, comprising:

a processor;

a memory accessible by the processor;

a display to present a visible representation of an electronic book, wherein the electronic book includes a total number of pages;

a touch sensor to accept user input; and one or more modules stored in the memory and executable on the processor to present, in response to determining that the user input includes a substantially horizontal swiping motion of two or more coincident touches, a graphical user interface that facilitates user navigation through different locations in the electronic book, the graphical user interface including a representation of an edge of the electronic book and the one or more modules facilitating the user navigation in response to user selection of different locations represented on the edge of the electronic book via the touch sensor, wherein one or more dimensions of the representation of the edge are proportionate to, at least in part, the total number of pages of the electronic book and a location of a displayed page determined with respect to the total number of pages of the electronic book, wherein:

the representation of the edge is displayed to a right of a displayed page when the substantially horizontal swiping motion includes a multi-touch right-to-left swiping motion; and the representation of the edge is displayed to a left of the displayed page when the substantially horizontal swiping motion includes a multi-touch left-to-right swiping motion.

16. The electronic device of claim 15, wherein the representation of the edge of the electronic book includes one or more bookmark indicia associated with respective bookmarks previously inserted by a user of the electronic device.

17. The electronic device of claim 16, wherein the bookmark indicia are arranged upon the edge of the electronic book such that they are spatially relative to one another based at least in part upon relative positions within the electronic book which each corresponding bookmark index references.

18. The electronic device of claim 15, wherein the touch sensor and the display form a touch-sensitive display.

19. A computer-readable storage medium having stored therein instructions, which when executed by an electronic device, cause the electronic device to generate a user interface comprising:

one or more content regions to present a part of a digital content item on a display; and an edge navigation region disposed adjacent to the one or more content regions, the edge navigation region presenting a virtual edge having one or more dimensions proportionate, at least in part, to a total length of the digital content item and a location of the part of the digital content item determined with respect to the total length of the digital content item, wherein:

the edge navigation region is displayed in response to detecting a substantially horizontal swiping motion of two or more coincident touches in a direction from a first side of the one or more content regions toward a second side of the one or more content regions; and a location of the edge navigation region is determined to be adjacent to the first side of the one or more content regions.

20. The computer-readable storage medium of claim 19, further comprising presenting one or more bookmark indicia within the edge navigation region, the one or more bookmark indicia each being associated with a corresponding bookmark within the digital content item.

21. The computer-readable storage medium of claim 20, wherein the bookmark comprises at least one of: a location mark, a note, a search, a data access, a chapter, segment, a track, a section, or a topical heading associated with specified locations within the digital content item.

22. The computer-readable storage medium of claim 19, wherein the digital content item comprises an electronic book.

23. The computer-readable storage medium of claim 19, wherein the digital content item comprises an electronic book, each of the one or more content regions comprises a respective page of the electronic book, and one or more bookmark indicia are presented upon an edge of the electronic book.

24. The computer-readable storage medium of claim 19, wherein the digital content item comprises one of an electronic book, a video item, or a multimedia item.

25. The computer-implemented method of claim 1, further comprising narrowing a horizontal dimension of the virtual edge of the electronic book responsive to the user selection of the location within the virtual edge.

26. The computer-implemented method of claim 7, wherein:

the virtual edge includes a vertical line that is associated with a particular bookmark located at a particular page of the electronic book; and a horizontal location of the vertical line along the virtual edge is determined based on a location of the particular page relative to the total number of pages of the electronic book.

27. The computer-implemented method of claim 1, wherein the user input detected while the electronic device is operating in the reading mode includes a multi-touch right-to-left swiping motion, the method further comprising:

while the electronic device is operating in the edge navigation mode, detecting a second user input via the touchscreen display; and transitioning the electronic device back to the reading mode in response to determining that the second user input comprises a multi-touch left-to-right swiping motion.

28. The computer-implemented method of claim 1, further comprising:

while the electronic device is operating in the edge navigation mode, detecting a second user input via the touchscreen display; and transitioning the electronic device back to the reading mode of operation in response to determining that the second user input comprises a single-touch horizontal swiping motion.

\* \* \* \* \*